United States Patent [19]

Kakimoto

[11] 3,855,872
[45] Dec. 24, 1974

[54] ROTARY DRIVE APPARATUS
[76] Inventor: Masakazu Kakimoto, 78, Azaooshima Ooazaasada, Nisshincho, Aichi-ken, Japan
[22] Filed: Aug. 29, 1973
[21] Appl. No.: 392,927

[30] Foreign Application Priority Data
Dec. 28, 1972 Japan.................................. 48-1929
Feb. 14, 1973 Japan................................ 48-18203

[52] U.S. Cl. .......................................... 74/242.16
[51] Int. Cl. .............................................. F16h 7/10
[58] Field of Search ................................. 74/242.16

[56] References Cited
UNITED STATES PATENTS
3,626,772  12/1971  Gutzmer ...................... 74/242.16 X
3,733,919   5/1973  Rupp ............................. 74/242.16

Primary Examiner—Leonard H. Gerin
Attorney, Agent, or Firm—McGlew and Tuttle

[57] ABSTRACT

A rotary drive apparatus comprises a housing including an intermediate transmission portion, an input shaft portion connected to one end of the intermediate transmission portion and extending outwardly therefrom in a first direction and an output shaft portion connected to the opposite end of the intermediate transmission portion and extending outwardly therefrom in a second opposite direction. The intermediate transmission portion is provided with an exhaust port for the exhaust of air which is directed under pressure to an air motor which is carried eccentrically in a rotatable mounting in the input shaft portion of the housing. The air motor includes a drive pulley on its drive shaft which is connected through a belt to a driven pulley carried on a output shaft which is rotatably supported in the output shaft portion of the housing and which includes an outer drive end which is connected to a drive element, for example, a grind stone. Compressed air which is circulated through the drive motor is discharged through the exhaust port of the intermediate transmission portion of the housing. The tension on the drive belt extending between the input pulley on the air motor drive shaft and the output pulley carried on the output shaft may be adjusted by rotating the mounting for the air motor so as to vary the spacing between the input and the output shafts and thereby to adjust the tension on the belt. After this tension is adjusted the mounting for the air motor is clamped into position.

10 Claims, 10 Drawing Figures

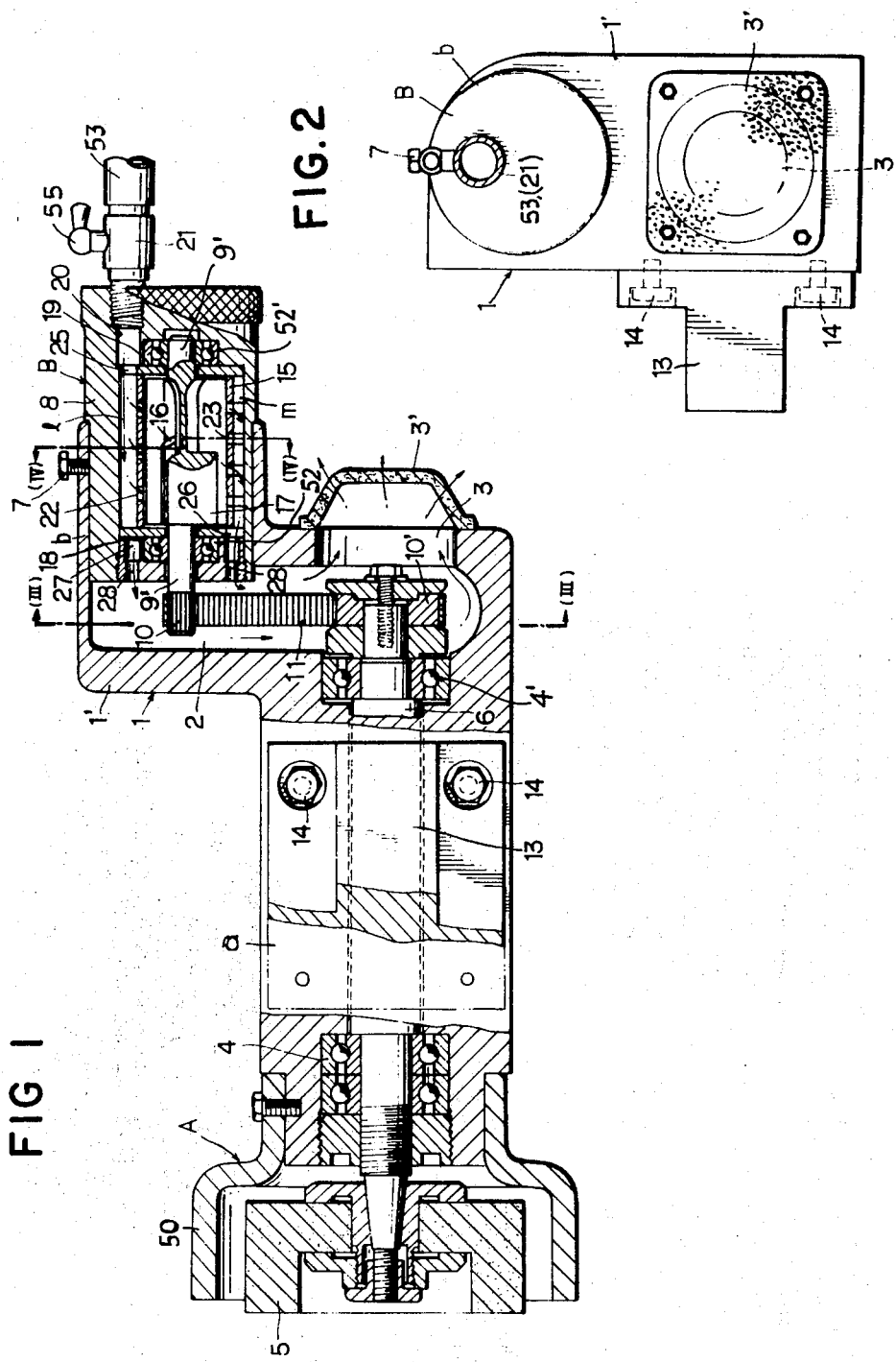

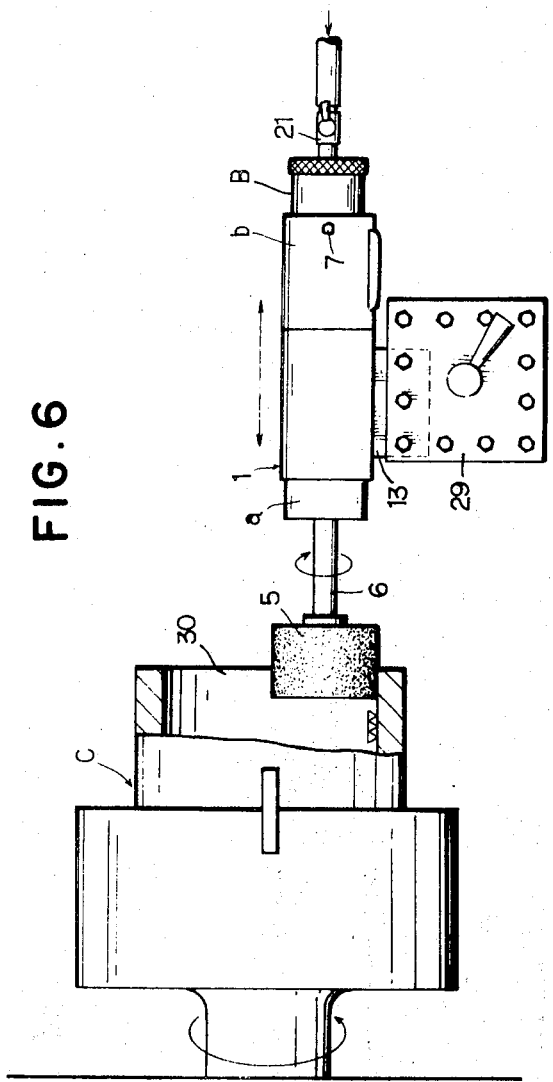

ROTARY DRIVE APPARATUS

BACKGROUND OF THE INVENTION

1. Field of the Invention

This invention relates in general to the construction of a rotary drive apparatus and in particular to a new and useful rotary drive apparatus which includes a driving air motor which is mounted eccentrically in one leg of a generally S-shaped housing at a spaced location from an output shaft which is rotatably mounted in the opposite leg portion and wherein the intermediate portion comprises a transmission housing for a drive belt system which has a belt which may be adjusted in tension by rotating the position of the air motor in the associated leg portion of the housing.

2. Description of the Prior Art

The invention relates particularly to a rotary drive apparatus which includes a driving air motor which has a shaft which is adapted to be connected through a suitable transmission to an output shaft. The known constructions or devices of this sort have complicated housings and separate transmissions which make them very expensive and make them such that they are difficult to adjust. In addition, the known devices require separate arrangements for the driving air motor and for its exhaust air.

SUMMARY OF THE INVENTION

In accordance with the present invention there is provided a rotary drive apparatus which includes a unified housing construction including an intermediate transmission housing portion with an input shaft housing portion at one end for the driving air motor and an output housing portion at the opposite end of the intermediate transmission portion for rotatably supporting an output shaft. With the inventive construction, the transmission, which comprises a belt transmission is easily accommodated within the intermediate housing portion. A feature of the invention is that the driving motor, which is an air motor, is rotatably supported in the input housing portion and lies eccentrically to the rotatable support so that rotation of the support changes the spacing between the drive shaft and the output shaft. This arrangement is used to adjust the tension between a driving belt engaged over the drive shaft pulley and the output shaft pulley. In addition, the intermediate housing provides a very accessible portion for adjusting the belt and the pulleys and it also provides a space for an exhaust port which is provided therein. The exhaust port is located at the remote end of the transmission housing portion in respect to the driving air motor and the arrangement promotes the efficiency of the air motor by increasing its exhaust effect. The driving belt pulleys may be easily adjusted to provide a means for adjusting the revolutions of the output shaft and the operating parts are continuously cooled by the air which is circulated in the transmission housing and out through the exhaust port.

The air motor is driven by compressed air to rotate the main shaft of the motor to drive the belt transmission system and the output shaft. The rotary eccentric mounting of the air motor permits an easy change of the tension of the drive belt extending between the pulley on the drive shaft and the pulley on the output shaft. The arrangement permits a maximum tensioning of the belt so that sliding motion between the main drive shaft and the output shafts is relatively small and is advantageous for high speed operation. The air which is discharged from the air motor passes over the operating parts in the transmission housing portion and is discharged at the output shaft end of the intermediate transmission housing portion, so that the rotary parts are continuously cooled.

Accordingly, it is an object of the invention to provide an improved rotary drive apparatus having a housing with an intermediate transmission housing portion and with an input shaft portion having means for rotatably supporting a driving air motor with its drive shaft eccentrically positioned so that it may adjusted by the rotation for changing its spacing in respect to an output shaft which is rotatably supported in an opposite output shaft portion of the housing and wherein the tension on a transmission belt between a drive pulley on the motor shaft and a driven pulley on the output shaft may be adjusted by the rotation of the motor in its housing portion.

A further object of the invention is to provide a rotary drive apparatus which is simple in design, rugged in construction and economical to manufacture.

For an understanding of the principles of the invention, reference is made to the following description of a typical embodiment thereof as illustrated in the accompanying drawings.

BRIEF DESCRIPTION OF THE DRAWINGS

In the drawings:

FIG. 1 is a partial elevational and partial axial sectional view of a rotary drive apparatus constructed in accordance with the invention;

FIG. 2 is a rear elevation of the device shown in FIG. 1;

FIG. 6 is a top plan view of the device shown in operation for grinding in FIG. 5;

GENERAL DESCRIPTION OF THE PREFERRED EMBODIMENTS

Figure 5:
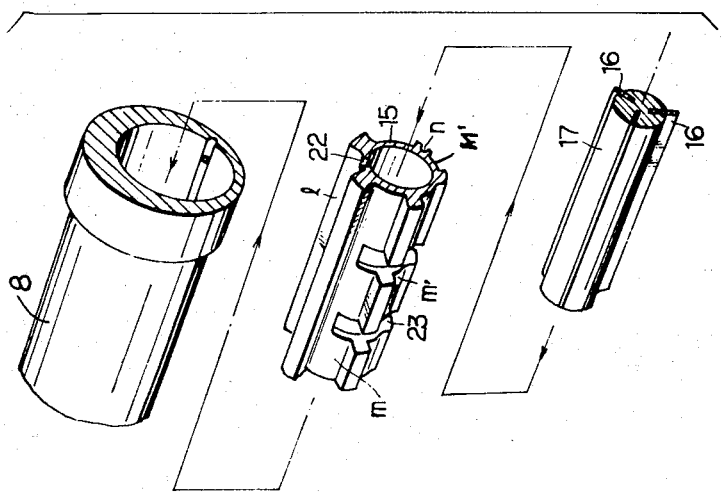
FIG. 5 is an exploded or disassembled perspective view of the air motor.

Referring to the drawings in particular, the invention embodied therein comprises a rotary drive apparatus which includes a housing generally designated 1 which comprises an intermediate transmission housing portion 1' with an output housing portion *a* extending outwardly therefrom in a first direction adjacent one end of the intermediate housing portion and an input housing portion *b* extending outwardly from the opposite end of the intermediate transmission portion 1' in a direction opposite to the output housing portion *a*.

In accordance with the invention the intermediate transmission housing portion 1' defines a vacant chamber 2 which is the center of a generally S-shaped cavity with one leg being in the output housing portion a and the other leg being in the input housing portion b. The output housing portion a provides a mounting for bearings 4,4' for rotatably supporting an output shaft 6 which, in the embodiment shown, contains a grinder assembly generally designated A. The inner end of the output shaft 6 extends into the intermediate transmission housing portion 1' but in the lower end of the chamber 2. The opposite end contains a grindstone 5 which is shielded by a surrounding casing 50.

Figure 3:
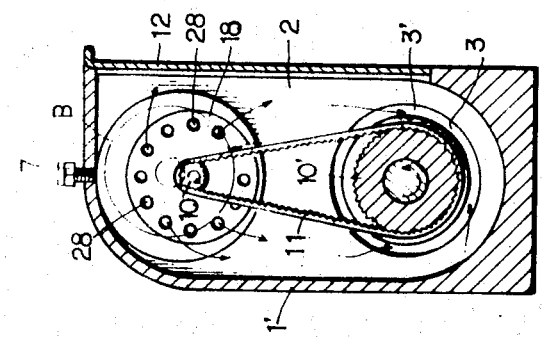
FIG. 3 is a section taken along the line III—III of FIG. 1.
Figure 7:
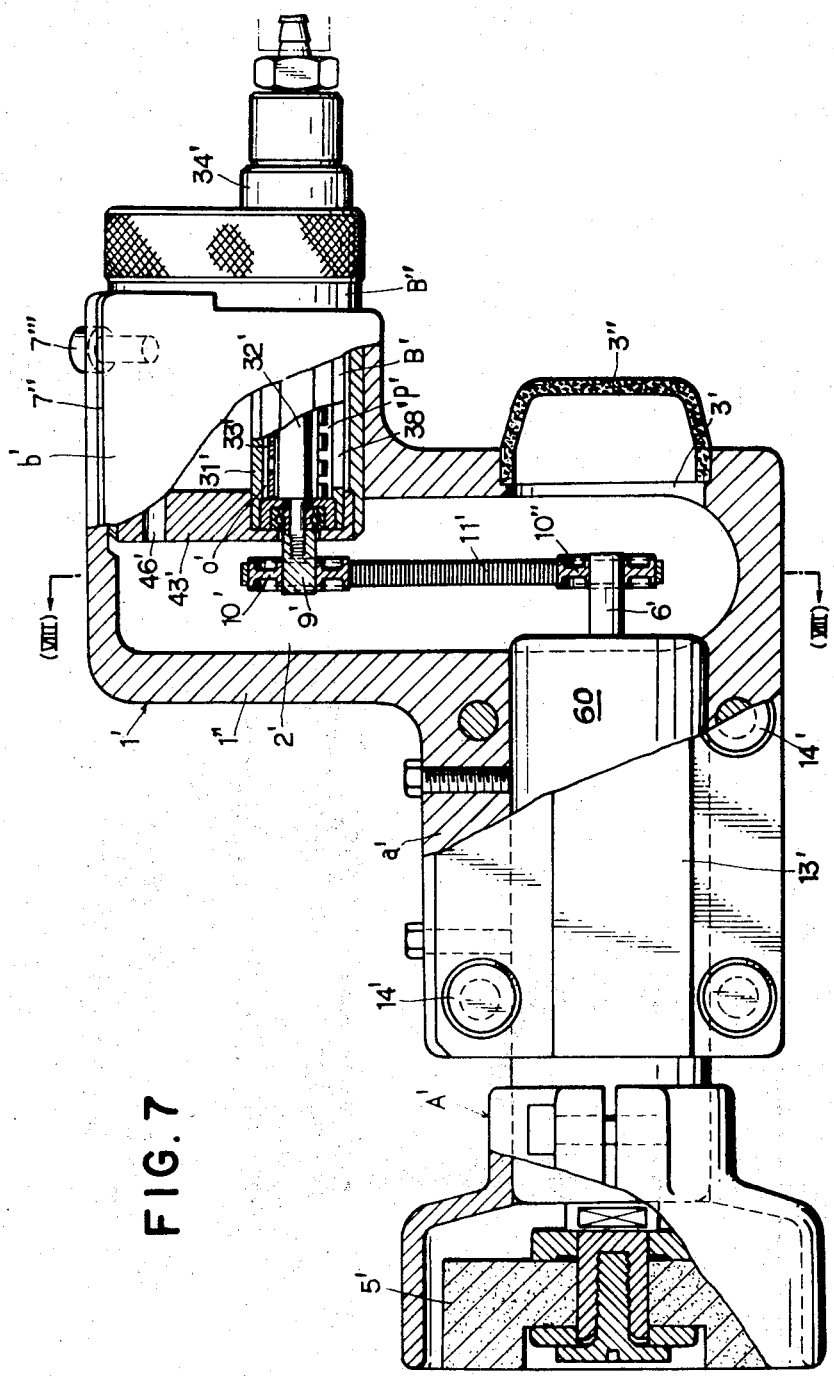
FIG. 7 is a view similar to FIG. 1 of another embodiment of the device.

An air motor generally designated B is eccentrically arranged within support means 8 which is rotatably supported in the input housing portion b. The support means 8 comprises a cylindrical member which is rotatable in a cylindrical portion of the input housing portion b and it is clamped in an adjustable position to fix the location of the air motor drive shaft 9 by a clamping bolt 7 (FIG. 1). The main shaft 9 of the air motor B projects into the chamber 2 and it carries a drive pulley 10 which is connected through a belt 11 to drive the driven pulley 10' which is carried on the output shaft 6. The belt 11 may be adjusted on the two pulleys 10 and 10' by removing a cover 12 shown in FIG. 3, which overlies the intermediate transmission portion 1' of the housing 1. The belt 11 may be a positive drive belt or one having gearing or serrations engageable with similar gears or serrations on the respective pulleys 10 and 10'.

The air motor B comprises a cylinder 15 arranged within the housing 7 and it includes a rotor 17 within the cylinder 15 which revolves therein and which includes blades 16. End wall 19 abuts against a bearing 52 located below an inlet port 20 for a fitting 21 for the air supply which is adapted to be connected to a supply pipe 53 having a valve 55 which connects to a compressed air supply (not shown) to feed compressed air into the casing 15. The rotor 17 includes an eccentric main portion with concentric end portions 9 and 9' which are supported in roller bearings 52 and 52' at respective ends. The portion 9' forms the main drive shaft 9. The compressed air flows from the air supply ports 22 into the cylindrical support 8 for outflow through a discharge passage 28 into the intermediate transmission portion chamber 2. The flow of the air causes the rotation of the rotor by action of the blade 16 and is continuously exhausted into the chamber 2 where it flows downwardly over the operating parts and out through an exhaust port 3 which is covered by an exhaust port filter 3'. The air flows through the filter 3' to the outside of the housing 1.

The rotation of the rotor 17 produces rotation of the drive shaft 9 and through the pulleys 10' and 10 and the belt 11, the output shaft 6 and the grindstone 5. The tension on the belt 11 may be adjusted simply by loosening the clamp 8 which holds the housing 7 of the air motor in the output portion b of the housing. The housing 7 of the air motor is then rotated to change the spacing of the centerline of the shaft 9 with respect to the shaft 6 and therefore the tension of the belt 11.

The grinder A may be of a selected sixe which may be inserted directly into the cylindrical body a and exchanged as a unit. Such a unit may comprise several types of grindstones 5 and pulleys 10 of different sizes according to the power and speed of operation which is desired. After a new grindstone unit is replaced it is secured into position by bolts 58 and the belt 11 and the tension thereon are adjusted as mentioned previously. A rod 13 of the housing portion a is fixed on a chuck of a machine tool. The grinder A is used for grinding raw materials.

Figure 4:
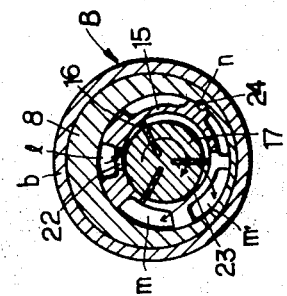
FIG. 4 is a section taken along the line IV—IV of FIG. 1.

As shown in FIG. 5, the cylinder 15 is a pipe or tube made from alumite material by extrusion molding and it is provided with longitudinal grooves $l, m, m', n'$ and $n$ on its outer surface at regular intervals. One groove, the groove $l$ finds the air supply path and two grooves, grooves $m$ and $m'$ define the exhaust path. The remaining grooves $n', n$ define pin grooves. The cylinder 15 is held in a slinging state but fixed with pin 24 as shown in FIG. 4 inserted in the pin groove $n$. The cylinder 15 is combined with retainers 18 and 19 at front and rear ends thereof within the support means or housing 8. The rotor 17 in the cylinder 15 is braced by the retainers 18 and 19 in an eccentric free rotation state. The cylinder 15 and the casing 8 are molded by an unequal padding process to make the main shaft 9 of the rotor 17 eccentric to the casing center.

Compressed air which is supplied from the supply pipe 21 into the air motor B moves into the cylindrical housing 15 through the openings 22 and moves along air supply path 1 through an air supply port 20 and an air port feed 25. In the cylinder 15 it pushes and moves the blades 16 to make the rotor 17 turn and then it flows out into the exhaust path $m, m'$ through the exhaust discharge 23. The air moves to the front through the exhaust path $m, m'$ and flows into the vacant chambers 2 in the main body $l'$ from the outflow ports 28 via the air flow port 26 and the loop path 27. The exhaust flows into the vacant chamber 2, moves along the chamber from the top to the bottom and goes out the exhaust port 3 to the outside of the casing 1.

Revolution of the rotor 17 of the air motor B is transmitted to the belt 11 by the main shaft 9 and a grindstone 5 is revolved by the grinder A shaft 6. By loosening a clamp 7 of the case 1 the air motor B is revolved at a slight angle in order to set the tension of the belt 11.

The casing includes a projecting rod portion 13 which may be fixed on a chuck 29 as indicated in FIG. 6, in order to position the grindstone 5 in an operating position to grind the interior of a cylindrical portion 30 of a machine tool C.

In the embodiment of the invention shown in FIGS. 7 to 10, similar parts are similarly shown but with a prime added to the previous indicated number. In this construction, the apparatus 1' includes a main housing 1'' having cylindrical end portions $a'$ and $b'$. Both end portions are hollow and the shaft 6' is rotatably supported in a housing 60 which is inserted into the hollow cylindrical bore of the body portion $a'$. Belts 10' on the shaft 9' and 10'' on the shaft 6' are located in the chamber 2' of the intermediate transmission portion of the housing. The air motor B' is inserted into the cylindrical input portion b of the housing and it is rotatable therein for adjusting the tension of the belt 11' as before. In this embodiment, the air structure and its mounting are slightly different from that of the other embodiment. The air motor B' includes a holder B'' which is inserted into the cylindrical body b and is freely rotatable therein. The input portion b of the housing includes a notch 7'' extending axially which is engaged by a thread bolt 7''' to fix the motor support B'' in position.

Figure 9:
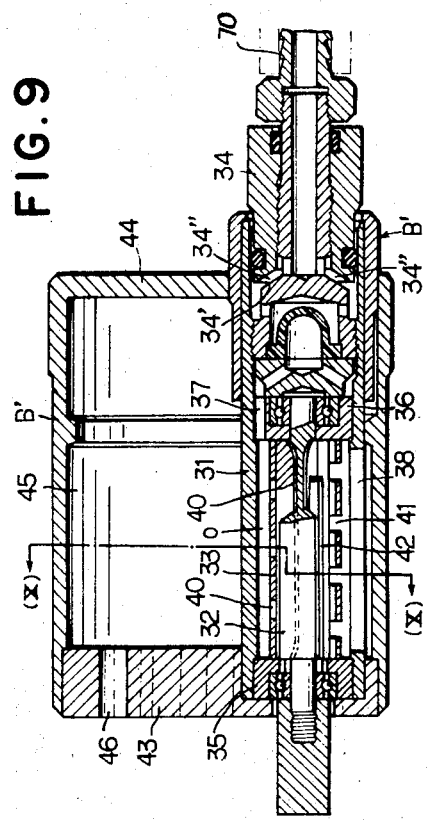
FIG. 9 is an enlarged longitudinal sectional view of the holder for the air motor and the air motor.
Figure 10:
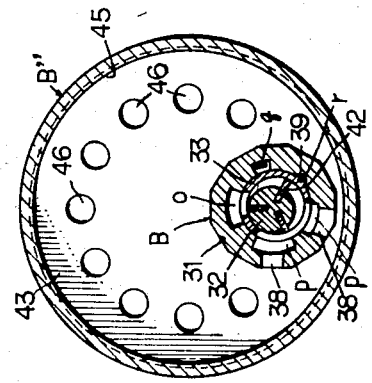
FIG. 10 is a section taken along the line X—X of FIG. 9.
Figure 8:
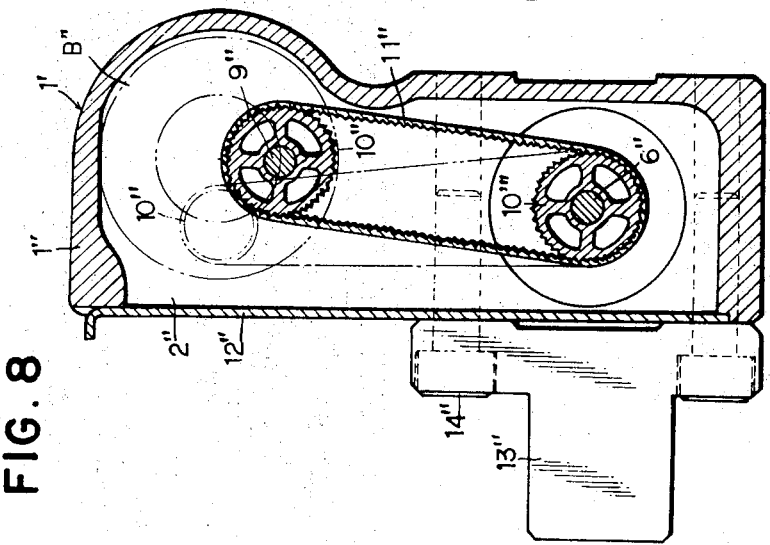
FIG. 8 is a section taken along the line VIII—VIII of FIG. 7.

As best shown in FIGS. 9 and 10, the air motor B' comprises a cylinder 33 with a casing 31 containing a rotor 32 and a valve tube 34 connected with an air hose 70. The casing 31 is tubular and made by extrusion molding of alumite and has an inside surface with vertical grooves o,p,q and r which are formed at spaced intervals during the extrusion molding. After molding the grooves on the rear part of the casing 31 they are cut. The groove o is an air supply path and grooves p,p are exhaust paths while grooves q and r are retaining grooves and pin grooves respectively. Retainers 35 and 36 on the front and rear ends respectively are fixed at both ends of the casing 31 with the retaining groove q in order to prevent revolution thereof. The rear retainer 36 has an air supply hole 37 corresponding to the rear end of the air supply path o. The outer circumference of casing 31 includes a long hole opened in a direction facing the exhaust paths p,p making the exits thereof exhaust ports 38, 38.

The cylinder 33 is closely fixed in the casing 31 at both ends in order that it be as close as possible to the retainers 35 and 36. The pins 39 are mounted in the pin groove r and hold the cylinder to be fixed in the casing 31.

An air supply port 40 and an exhaust port 41 are on the cylinder 33 correspond to the air supply path o and the exhaust paths p respectively. Both ends of the rotor 32 are supported by the retainers 35 and 36 in order to obtain eccentric free revolution in the cylinder 33. On the outer surface, there are blades 42 which can appear and disappear at will. The pulley 10 is mounted on the rotor 32 with the unified shaft 9 thrusting out in front of the casing 31. A valve pipe 34 is affixed to the rear end of the casing by means of an adjustment screw (not shown). By adjusting the screw the valve surface 34' and the casing can be made to move together so that they closely touch each other or may be moved apart so that they separate, thus opening or closing an air hole 34 in order to supply or stop the compressed air or to adjust the air flow. The motor holder B' is cylindrical and it is a little shorter than the air motor B having the hollow interior. On the front and rear walls 43 and 44 of the holder B' the air motor and the valve pipe 34 extend out in the front and rear respectively.

The holder B' has a large diameter so that the cavity 45 may be formed on the outer circumference of the air motor B. Air holes 46,46 open on the front wall 43 of the holder B' and these holes pass through the vacant chamber 2 with a casing 1 to connect the cavity 45 of the holder B' with the vacant chamber 2. The compressed air which is forced into the air motor from the air hose connected to the valve tube 34 is sent to the air supply path o through the opening 34'' and the air supply hole 37. It is then fed through this path a into the cylinder 33 to the air supply port 40 so as to rotate the rotor 32 by pushing and moving the blade 42 in the cylinder 33. The compressed air flows out of the exhaust ports 38, 38 into the cavity 45 of the holder B'' through the exhaust hole 41 and the exhaust paths p,p. Later the compressed air flows into the vacant chamber 2 of the casing 1 through the air holes 46, 46 and then the exhaust through the exhaust port 3' out of the casing 1'. In this manner, the surface of the air motor B' is cooled by the exhaust air flowing out of the exhaust port 38 and into the cavity 45 of the holder B'', and thus, the main shaft 9', the rotary shaft 6' and the pulleys 10'' and 10''' are cooled by the exhaust air flowing out of the holder B'' through the vacant chamber 2''.

In addition, the compressed air which starts at the air motor flows into the cavity 45 of the holder B'' after rotating the rotor 32, and thereafter, the exhaust air from the air motor smoothly flows out of the casing and decreases the exhaust air resistance. Accordingly, the efficiency of the air motor is notably improved.

In this embodiment as in the other embodiment, the spacing between the shafts 9'' and 6'' may be adjusted by rotating the support for the motor in the housing input portion b'.

While specific embodiments of the invention have been shown and described in detail to illustrate the application of the principles of the invention, it will be understood that the invention may be embodied otherwise without departing from such principles.

What is claimed is:

1. A rotary drive apparatus comprising a housing including an intermediate transmission portion, an input shaft portion connected to one end of said intermediate transmission portion and extending outwardly therefrom in a first direction, an output shaft portion connected to the opposite end of said intermediate transmission portion and extending outwardly therefrom in a second direction opposite to the first direction, an air motor exhaust port located in said housing adjacent said output shaft portion, an air motor having a rotatable drive shaft with a driven end projecting into said intermediate transmission portion of said housing and having a drive pulley affixed thereto, support means rotatably supporting said air motor in said input shaft portion with said drive shaft being eccentrically located in respect to said support means and being shiftable upon rotation of said support means, an output shaft rotatably supported in said output shaft portion and having a driven end projecting into said intermediate transmission portion of said housing and having an output pulley affixed thereto, a drive belt engaged over said input and output pulleys for driving said output shaft by said air motor, said air motor having an air discharge directed into said intermediate transmission portion of said housing for flow along said housing and exhaust at the opposite end through said exhaust port, said support means being rotatable to change the spacing between said output and input shafts in order to adjust the tension of said belt.

2. A rotary drive, according to claim 1, including means for clamping said support means in an adjusted position in respect to said input shaft portion of said housing.

3. A rotary drive, according to claim 1, wherein said air motor includes a tubular housing, said support means comprising a cylinder holding said housing eccentrically in respect to said cylinder, said cylinder being rotatable in said input shaft portion of said housing.

4. A rotary drive apparatus, according to claim 1, including a removable cover closing said intermediate transmission portion of said housing which is removable for access to said belt and said driving pulleys.

5. A rotary drive apparatus, according to claim 1, including a grinding wheel assembly extending into said output portion of said shaft, said grinding assembly comprising an outer support cylinder rotatably supporting said output shaft and means for clamping said support cylinder in said output shaft portion of said housing.

6. A rotary drive apparatus, according to claim 1, wherein support means includes a cylinder having an eccentric cylindrical bore therethrough, an air motor housing engaged in said eccentric cylindrical bore, and a rotor having radially extending blades rotatable in said housing, said air motor housing having a plurality of flow ducts defined between it and said cylindrical member.

7. A rotary drive, according to claim 1, wherein said support means includes an end wall located at the interior of said input portion of said housing having an opening therethrough defining a discharge for the compressed air driving said air motor leading into said intermediate transmission portion of said housing.

8. A rotary drive, according to claim 7, wherein said intermediate transmission portion of said housing includes a sidewall having an opening therethrough extending over a major portion of the length thereof, and a cover closing said opening.

9. A rotary drive, according to claim 1, including a projecting mounting member on said intermediate transmission portion of said housing defining a projecting plate which is engageable by a vice to position the device for operation.

10. A rotary drive, according to claim 1, wherein said support means for said motor includes a plate adjacent each end of said motor, said motor having a housing abutting against said plates at its respective ends and having peripheral openings and being spaced from the interior of said support means, said support means defining a flow path around said housing, said plates having openings communicating with said flow path for the flow of the air into said intermediate transmission portion of said housing.

* * * * *